United States Patent
Liu et al.

(10) Patent No.: US 9,307,237 B2
(45) Date of Patent: Apr. 5, 2016

(54) REFERENCE PIXEL REDUCTION FOR INTRA LM PREDICTION

(71) Applicant: Futurewei Technologies, Inc., Plano, TX (US)

(72) Inventors: Lingzhi Liu, San Jose, CA (US); Guichun Li, Mountain View, CA (US); Nam Ling, San Jose, CA (US); Jianhua Zheng, Beijing (CN); Philipp Zhang, Plano, TX (US); Li Song, Shanghai (CN)

(73) Assignees: Futurewei Technologies, Inc., Plano, TX (US); Santa Clara University, Santa Clara, CA (US)

( * ) Notice: Subject to any disclaimer, the term of this patent is extended or adjusted under 35 U.S.C. 154(b) by 492 days.

(21) Appl. No.: 13/745,134

(22) Filed: Jan. 18, 2013

(65) Prior Publication Data

US 2013/0188703 A1 Jul. 25, 2013

Related U.S. Application Data (60) Provisional application No. 61/588,359, filed on Jan. 19, 2012.

(51) Int. Cl.
*H04N 7/12* (2006.01)
*H04N 19/50* (2014.01)
(Continued)

(52) U.S. Cl.
CPC ....... *H04N 19/00569* (2013.01); *H04N 19/503* (2014.11); *H04N 19/186* (2014.11)

(58) Field of Classification Search
CPC .......... H04N 19/186; H04N 19/00569; H04N 19/82; H04N 19/105; H04N 19/117; H04N 19/593; H04N 19/70; H04N 19/11; H04N 19/30; H04N 19/463; H04N 19/50; H04N 19/61; H04N 19/80
USPC ............ 375/240.01–240.29; 382/238; 348/43
See application file for complete search history.

(56) References Cited

U.S. PATENT DOCUMENTS

2005/0013375 A1* 1/2005 Dattani et al. ........... 375/240.24
2012/0134425 A1* 5/2012 Kossentini et al. ...... 375/240.25

(Continued)

FOREIGN PATENT DOCUMENTS

EP 2387242 A2 11/2011

OTHER PUBLICATIONS

Bross, B., et al., "WD5: Working Draft 5 of High-Efficiency Video Coding," Joint Collaborative Team on Video Coding (JCT-VC) of ITU-T SG16 WP3 and ISO/IEC JTC1/SC29/WG11, JCTVC-G1103_d6, 7th meeting, Nov. 21-30, 2011, retrieved from: phenix.int-evry.fr/jct/index.php, 230 pages.

(Continued)

*Primary Examiner* — Gims Philippe
(74) *Attorney, Agent, or Firm* — Conley Rose, P.C.; Grant Rodolph; William H. Dietrich (57) ABSTRACT

A video codec comprising a processor configured to generate a prediction block for a chroma block, wherein the prediction block comprises a predicted chroma sample, wherein the predicted chroma sample is based on a filtered reconstructed luma sample located in a corresponding reconstructed luma block, a plurality of downsampled filtered reconstructed luma samples located in positions neighboring the corresponding reconstructed luma block, and a plurality of downsampled chroma samples located in positions neighboring the chroma block.

11 Claims, 6 Drawing Sheets

(51) Int. Cl.
*H04N 19/503* (2014.01)
*H04N 19/186* (2014.01)

(56) References Cited

U.S. PATENT DOCUMENTS

| 2012/0195378 A1* | 8/2012 | Zheng et al. | 375/240.12 |
| 2012/0287995 A1* | 11/2012 | Budagavi | 375/240.12 |
| 2013/0113884 A1* | 5/2013 | Leontaris et al. | 348/43 |
| 2014/0086502 A1* | 3/2014 | Guo et al. | 382/238 |

OTHER PUBLICATIONS

Lee, J., et al., "Inconsistency of intra LM mode between HM and WD," Joint Collaborative Team on Video Coding (JCT-VC) of ITU-T SG16 WP3 and ISO/IEC JTC1/SC29/WG11, JCTVC-G419, 7th meeting, Nov. 21-30, 2011, 7 pages.

Foreign Communication From a Counterpart Application, PCT Application PCT/US2013/022156, International Search Report dated Apr. 18, 2013, 5 pages.

Foreign Communication From a Counterpart Application, PCT Application PCT/US2013/022156, Written Opinion dated Apr. 18, 2013, 9 pages.

Bossen, F., "Common Test Conditions and Software Reference Configuration," JCTVC-G1200, JCT-VC of ITU-T SG16 WP3 and ISO/IEC JTC1/SC29/WG11, 7th Meeting, Geneva Switzerland, Nov. 21-30, 2011, 4 pages.

Bross, B., et al., "WD5: Working Draft 5 of High-Efficiency Video Coding," JCT-VC-G1103d4, JCT-VC of ITU-T SG16 WP3 and ISO/IEC JTC1/SC29/WG11, 7th Meeting, Geneva Switzerland, Nov. 21-30, 2011, 219 pages.

Chen, J., et al., "CE6.a.4: Chroma Intra Prediction by Reconstructed Luma Samples," JCTVC-E266, JCT-VC of ITU-T SG16 WP3 and ISO/IEC JTC1/SC29/WG11, 5th Meeting, Geneva Switzerland, Mar. 16-23, 2011, 10 pages.

Lee, S., et al., "Intra prediction Method Based on the Linear Relationship Between the Channels for YUV 4:2:0 Intra Coding," 16th IEEE International Conference on Image Processing (ICIP), Nov. 7-10, 2009, pp. 1037-1040.

* cited by examiner

REFERENCE PIXEL REDUCTION FOR
INTRA LM PREDICTION

CROSS-REFERENCE TO RELATED
APPLICATIONS

The present application claims priority to U.S. Provisional Patent Application No. 61/588,359 filed Jan. 19, 2012 by Lingzhi Liu, et al. and entitled "Reference Pixel Reduction for Intra LM Prediction," which is incorporated herein by reference as if reproduced in its entirety.

STATEMENT REGARDING FEDERALLY
SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed before being communicated across modern day telecommunication networks. Video compression devices often use software and/or hardware at the source to encode the video data prior to transmission, thereby decreasing the quantity of data needed to represent video frames or images. The compressed data is then received at the destination by a video decompression device that decodes the video frames. Due to limited network resources, it is desirable to develop compression and decompression techniques that increase compression ratios and/or reduce implementation complexity without substantially sacrificing video quality.

SUMMARY

In one embodiment, the disclosure includes a video codec comprising a processor configured to generate a prediction block for a chroma block, wherein the prediction block comprises a predicted chroma sample, wherein the predicted chroma sample is based on a filtered reconstructed luma sample located in a corresponding reconstructed luma block, a plurality of downsampled filtered reconstructed luma samples located in positions neighboring the corresponding reconstructed luma block, and a plurality of downsampled chroma samples located in positions neighboring the chroma block.

In another embodiment, the disclosure includes a method used in video coding comprising downsampling filtered reconstructed luma samples located in positions neighboring a reconstructed luma block to generate a plurality of downsampled filtered reconstructed luma samples, downsampling reconstructed chroma samples located in positions neighboring a chroma block to generate a plurality of downsampled reconstructed chroma samples, and generating a prediction block for the chroma block, wherein the prediction block comprises a predicted chroma sample, wherein the predicted chroma sample is based on a filtered reconstructed luma sample located in the reconstructed luma block, the plurality of downsampled filtered reconstructed luma samples; and the plurality of downsampled reconstructed chroma samples.

In yet another embodiment, the disclosure includes a video codec comprising a processor configured to receive a chroma block, generate a filtered reconstructed luma block corresponding to the chroma block, downsample a plurality of filtered reconstructed luma samples and a plurality of reconstructed chroma samples to generate downsampled filtered reconstructed luma samples and downsampled reconstructed chroma samples, respectively, if the chroma block is larger than a threshold block size, wherein the plurality of filtered reconstructed luma samples are located in neighboring blocks of the filtered reconstructed luma block, and wherein the plurality of reconstructed chroma samples are located in neighboring blocks of the chroma block, generate a prediction block for the chroma block, wherein the prediction block comprises a plurality of predicted chroma samples, wherein each of the plurality of predicted chroma samples is based on a corresponding reconstructed luma sample located in a corresponding reconstructed luma block, the downsampled filtered reconstructed luma samples and the downsampled reconstructed chroma samples if the chroma block is larger than the threshold block size; and the plurality of filtered reconstructed luma samples and the plurality of reconstructed chroma samples if the chroma block is equal to the threshold block size.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, ..., 255) that represents an image quality or color at the corresponding reference point. The color space may be represented by three components including a luminance (luma or Y) component and two chrominance (chroma) components, denoted as Cb and Cr (or sometimes as U and V). A luma or chroma integer value is typically stored and processed in binary form using bits. The number of bits used to indicate a luma or chroma value may be referred to as a bit depth or color depth.

In use, an image or video frame may comprise a large amount of pixels (e.g., 2,073,600 pixels in a 1920×1080 frame), thus it may be cumbersome and inefficient to encode and decode (generally referred to hereinafter as code) each pixel independently. To improve coding efficiency, a video frame is usually broken into a plurality of rectangular blocks or macroblocks, which may serve as basic units of processing such as coding, prediction, transform, and quantization. For example, a typical M×M block may comprise $M^2$ pixels, where M is an integer greater than one and is often a multiple of four. In the YUV or YCbCr color space, each luma (Y) block corresponds to two chroma blocks including a Cb block and a Cr block. The Cb block and Cr block also correspond to each other. The chroma blocks and their corresponding luma block are may be located in a same relative position of a video frame, slice, or region.

In video coding, various sampling rates may be used to code the YCbCr components. The size of a Cb block, its corresponding Cr block, and/or its corresponding Y block may be the same or different depending on a sampling rate. For example, in a 4:2:0 sampling rate, each M×M chroma (Cb or Cr) block may correspond to a 2M×2M luma block. In this case, a width or height of the chroma block is half that of the corresponding luma block. The chroma components are downsampled or subsampled, since human eyes may be less sensitive to chroma components than to the luma component. For another example, in a 4:4:4 sampling rate, each M×M chroma (Cb or Cr) block may correspond to a M×M luma block. In this case, higher video fidelity may be preserved, but more data may need to be coded. Other sampling rates, such as 4:2:2, 4:2:1, etc., may also be used.

A block in a video frame may be spatially correlated with other blocks within the same frame such that pixel values across some blocks may vary only slightly and/or exhibit repetitious textures. Modern methods of video-compression exploit these spatial correlations using various techniques which may be known collectively as intra-frame prediction (or in short as intra prediction). When coding a current block using intra prediction, a prediction block or prediction unit is generated based on one or more previously coded reference blocks. The prediction block may be an estimated version of the current block. A residual block may be generated by subtracting the current block from the prediction block, or vice versa, which represents prediction residuals or errors. Since an amount of data needed to represent the prediction residuals may typically be less than an amount of data needed to represent the original block, the residual block may be coded instead of the current block to achieve a higher compression ratio.

Intra prediction may be implemented by a video encoder or decoder (generally referred to herein as a codec). In the encoder, a residual block generated by intra prediction may be transformed, quantized, and scanned before being included into an encoded data stream. Upon reception of the encoded data stream, a decoder may add a reconstructed residual block to an independently generated prediction block to recreate the current block. Although the recreated current block may be an imperfect version of the original current block, e.g., due to quantization, their differences may be hardly perceptible to the human eye. Thus, substantial bit savings may be derived without significantly degrading the quality of the reconstructed image.

In a video region where neighboring blocks are identical or near-identical, use of intra prediction may result in a residual block comprising many zero and/or near-zero pixel values. Furthermore, transformation, quantization, and/or scanning of the residual block may remove many of the zero and/or near-zero coefficients from the encoded data stream, thereby resulting in further compression of video data. Thus, more accurate prediction of the original image may result in higher coding efficiencies. To improve accuracy of intra prediction, video/image coding standards may utilize a plurality of intra prediction modes. For example, up to six intra prediction modes may be used for the chroma components (including Cr and Cb) in high efficiency video coding (HEVC), which is poised to be the next video standard issued by the Joint Collaborative Team on Video Coding (JCT-VC) of the International Telecommunications Union (ITU) Telecommunications Standardization Sector (ITU-T) and International Organization for Standardization (ISO)/International Electrotechnical Commission (IEC) Moving Picture Experts Group (MPEG).

For the chroma components, six intra prediction modes may include a chroma from luma prediction mode (referred to as a linear model, mode, or method (LM) mode), a vertical prediction mode, a horizontal prediction mode, a diagonal mode, a direct current (DC) prediction mode, and a direct mode (DM) derived from the luma component. Various algorithms may be used to determine an optimal intra prediction mode for a chroma block. For example, an encoder may test an intra predicting chroma block using some or all of the available modes, and then calculate a sum of absolute error (SAE) for each prediction mode. The prediction mode leading to the smallest SAE may be selected as the optimal mode. It should be noted that in a final HEVC standard to be issued, the intra prediction modes used for the chroma components may be different from the six aforementioned modes. The present disclosure relates mainly to the LM mode.

According to a HEVC work draft entitled "WD5: Working Draft 5 of High-Efficiency Video Coding" with document number JCTVC-G1103_d4, which is hereby incorporated by reference, a current design of LM mode utilizes reconstructed luma samples or pixels to generate chroma samples. Specifically, when a LM mode is to be implemented to generate a prediction block for a current chroma (Cb or Cr) block, the LM mode includes obtaining a linear combination of previously reconstructed luma samples that have been interpolated from within a corresponding luma block of the current chroma block. The LM mode further includes obtaining a linear combination of previously reconstructed luma samples from luma blocks which neighbor the corresponding luma block. In addition, the LM mode further includes obtaining previously reconstructed chroma samples from chroma blocks which neighbor the current chroma block.

According to JCTVC-G1103 d_4, sample values of the chroma prediction block may be derived using algorithms and/or equations (1) to (18) described in paragraphs below. Before getting to the equations, definitions of variables used in equations herein are given first.

For a reconstructed luma block with 2 nS (nS is a positive integer) luma samples on each of its four sides, [x, y] denotes a position or index of a luma sample in the reconstructed luma block, wherein both integers x and y range from 0 to 2nS−1. Further, recSamples$_L$[x, y] denotes a luma sample at position [x, y]. In HEVC working drafts (e.g., Document JCTVC- G1103 d_4), recSamples$_L$[x, y] may sometimes also be denoted as P$_{LM}$[x, y]. In equations herein, notation: m=n . . . k is used to suggest a range of values, wherein m starts from n (including n) and ends with k (including k), and wherein m, n, and k are all integers. For instance, x and y ranging from 0 to 2nS−1 is denoted as "x, y=0 . . . 2nS−1".

As mentioned above, reconstructed luma samples in the left and top neighboring luma blocks may also be used in the LM mode to predict the current chroma block. [x, −1] denotes a position or index of a luma sample in a column left to and adjacent the corresponding luma block (referred to hereafter as the left neighboring column), and [−1, y] denotes a position of a luma sample in the row above and adjacent the corresponding luma block (referred to hereafter as the top neighboring row), wherein both x and y range from 0 to 2nS−1. That is, standard array notation is followed where [x,y] denotes row position x and column position y. Further, recSamples$_L$[x, −1] denotes a luma sample at position [x, −1], and recSamples$_L$[−1, y] denotes a luma sample at position [−1, y].

In 4:2:0 sampling, the reconstructed 2nS×2nS corresponding luma block may be first filtered to an nS×nS luma block, which is then used as a reference block for intra prediction of the current chroma block. For the filtered luma block with nS luma samples on each of its four sides, p$_Y$'[x, y] denotes a filtered luma sample at position [x, y] wherein both x and y range from 0 to nS−1. Similarly, the left neighboring column and the top neighboring row comprising luma samples may also be first filtered before used reference samples in the LM mode. After filtering, p$_Y$'[x, −1] denotes a filtered luma sample at position [x, −1], and p$_Y$'[−1, y] denotes a value of a filtered luma sample at position [−1, y], wherein both x and y range from 0 to nS−1.

As mentioned above, previously coded chroma samples in the left and top neighboring chroma blocks may also be used in the LM mode. In the neighboring chroma blocks, [x, −1] denotes an index of a chroma sample in a column left of and adjacent the current chroma block (also referred to as the left neighboring column or vector), and [−1, y] denotes an index of a chroma sample in the row above and adjacent the current chroma block (also referred to as the top neighboring row or vector), wherein both x and y range from 0 to nS−1. Further, p[x, −1] denotes a chroma sample at position [x, −1], and p[−1, y] denotes a chroma sample at position [−1, y], wherein both x and y range from 0 to nS−1.

For the chroma prediction block to be computed, predSamples[x, y] denotes a prediction or predicted chroma sample at position [x, y], wherein x and y range from 0 to nS−1. BitDepthC denotes a number of bits (i.e., bit depth) used for the chroma component (Cr or Cb). For example, in HEVC, BitDepthC may equal 8 or 10 (or any other suitable value). If BitDepthC=8, chroma samples such as p[x, y] and predSamples[x, y] may have a maximum of 8 bits. In use, the luma component may typically have a same bit depth as the chroma component, thus filtered luma samples such as p$_Y$'[x, y] have a same maximum number of bits as p[x, y].

In the LM mode, to generate predicted chroma samples, the reconstructed luma samples are filtered first. Equation (2) applies a 3-tap filter with [1 2 1] coefficients to 2nS reconstructed luma samples located in the top neighboring row and produces nS filtered luma samples. Equation (3) applies a 2-tap averaging filter to 2nS reconstructed luma samples in the left neighboring column and produces nS filtered luma samples. Equation (3) also applies a 2-tap averaging filter to 2nS×2nS reconstructed luma samples in the corresponding luma block and produces nS×nS filtered reconstructed luma samples.

$$k3 = \text{Max}(0, \text{BitDepth}_C + \log_2(nS) - 14) \tag{1}$$

$$p_Y'[x,-1] = (\text{recSamples}_L[2x,-1] + 2*\text{recSamples}_L[2x,-1] + \text{recSamples}_L[2x+1,-1] + 2) >> 2, \text{ with } x=0 \ldots nS-1 \tag{2}$$

$$p_Y'[x,y] = (\text{recSamples}_L[2x,2y] + \text{recSamples}_L[2x,2y+1]) >> 1, \text{ with } x=-1 \ldots nS-1, y=0 \ldots nS-1 \tag{3}$$

A series of intermediate variables, denoted as L, C, LL, LC, and k2, may be introduced to derive predicted chroma samples (i.e., predSamples[x,y]) as shown in the following equations/pseudo code:

$$L = \left(\sum_{y=0}^{nS-1} p_Y'[-1, y] + \sum_{x=0}^{nS-1} p_Y'[x, -1]\right) \gg k3 \tag{4}$$

$$C = \left(\sum_{y=0}^{nS-1} p[-1, y] + \sum_{x=0}^{nS-1} p[x, -1]\right) \gg k3 \tag{5}$$

$$LL = \left(\sum_{y=0}^{nS-1} p_Y'[-1, y]^2 + \sum_{x=0}^{nS-1} p_Y'[x, -1]^2\right) \gg k3 \tag{6}$$

$$LC = \left(\sum_{y=0}^{nS-1} p_Y'[-1, y] * p[-1, y] + \sum_{y=0}^{nS-1} p_Y'[x, -1] * p[x, -1]\right) \gg k3 \tag{7}$$

$$k2 = \log_2((2*nS) \gg k3) \tag{8}$$

Next, more intermediate variables, denoted as a1, a2, k1, a1s, a2s, a3, alpha, k, and beta, may be derived using the following pseudo code:

$$a1 = (LC << k2) - L*C \tag{9}$$

$$a2 = (LL << k2) - L*L \tag{10}$$

$$k1 = \text{Max}(0, \log_2(abs(a2)) - 5) - \text{Max}(0, \log_2(abs(a1)) - 14) + 2 \tag{11}$$

$$a1s = a1 >> \text{Max}(0, \log_2(abs(a1)) - 14) \tag{12}$$

$$a2s = abs(a2 >> \text{Max}(0, \log_2(abs(a2)) - 5)) \tag{13}$$

$$a3 = a2s < 1 ? 0 : \text{Clip3}(-2^{15}, 2^{15}-1, a1s*lm \text{ Div } [a2s] + (1 << (k1-1))) >> k1) \tag{14}$$

$$\text{alpha} = a3 >> \text{Max}(0, \log_2(abs(a3)) - 6) \tag{15}$$

$$k = 13 - \text{Max}(0, \log_2(abs(\text{alpha})) - 6) \tag{16}$$

$$\text{beta} = (L - ((\text{alpha}*C) >> k) + (1 << (k2-1))) >> k2 \tag{17}$$

After obtaining alpha, beta, and k, predicted chroma samples may be computed as follows:

$$\text{predSamples}[x,y] = \text{Clip1}_C(((p_Y'[x,y]*\text{alpha}) >> k) + \text{beta}), \text{ with } x,y=0 \ldots nS-1 \tag{18}$$

where function Clip1$_C$(x) is defined as $$\text{Clip1}_C(x) = \text{Clip3}(0, (1 << \text{BitDepth}_C) - 1, x)$$

and where function Clip3(x, y, z) is defined as $$\text{Clip3}(x, y, z) = \begin{cases} x; & z < x \\ y; & z > y \\ z; & \text{otherwise} \end{cases}$$

Note that the predicted chroma samples predSamples [x,y] are based on filtered luma samples in a corresponding block as well as filtered luma samples in a left neighboring column and top neighboring row as well as reconstructed chroma samples in a left neighboring column and top neighboring row. Additional details on equations (1) through (18) may be found in the document JCTVC-G1103_4.

In the above pseudo code, after a2s is calculated from equation (13), it is used as an index or key of a look-up table to get a value of 1 mDiv, which is then used in equation (14). Table 1 shows a specification of an 1 mDiv look-up table, which is listed as Table 8-9 in the document JCTVC-G1103_d4.

TABLE 1

Specification of lmDiv look-up table in JCTVC-G1103_d4.

| a2s | 1 | 2 | 3 | 4 | 5 | 6 | 7 | 8 | 9 | 10 | 11 | 12 | 13 |
|---|---|---|---|---|---|---|---|---|---|---|---|---|---|
| lmDiv | 32768 | 16384 | 10923 | 8192 | 6554 | 5461 | 4681 | 4096 | 3641 | 3277 | 2979 | 2731 | 2521 |
| a2s | 14 | 15 | 16 | 17 | 18 | 19 | 20 | 21 | 22 | 23 | 24 | 25 | 26 |
| lmDiv | 2341 | 2185 | 2048 | 1928 | 1820 | 1725 | 1638 | 1560 | 1489 | 1425 | 1365 | 1311 | 1260 |
| a2s | 27 | 28 | 29 | 30 | 31 | 32 | 33 | 34 | 35 | 36 | 37 | 38 | 39 |
| lmDiv | 1214 | 1170 | 1130 | 1092 | 1057 | 1024 | 993 | 964 | 936 | 910 | 886 | 862 | 840 |
| a2s | 40 | 41 | 42 | 43 | 44 | 45 | 46 | 47 | 48 | 49 | 50 | 51 | 52 |
| lmDiv | 819 | 799 | 780 | 762 | 745 | 728 | 712 | 697 | 683 | 669 | 655 | 643 | 630 |
| a2s | 53 | 54 | 55 | 56 | 57 | 58 | 59 | 60 | 61 | 62 | 63 | 64 | |
| lmDiv | 618 | 607 | 596 | 585 | 575 | 565 | 555 | 546 | 537 | 529 | 520 | 512 | |

In equations (4) through (7), reference samples from reconstructed above and left neighboring blocks may be used to calculate the parameters needed for the LM mode intra prediction, L, C, LL, and LC. In the current design of HEVC Test Model, HM v5.0, the calculations in equations (4) through (7), involve 2nS downsampled reconstructed luma samples and 2nS reconstructed chroma samples, where nS is the prediction size, which is equal to the width or height of the current predicted block.

Figure 1:
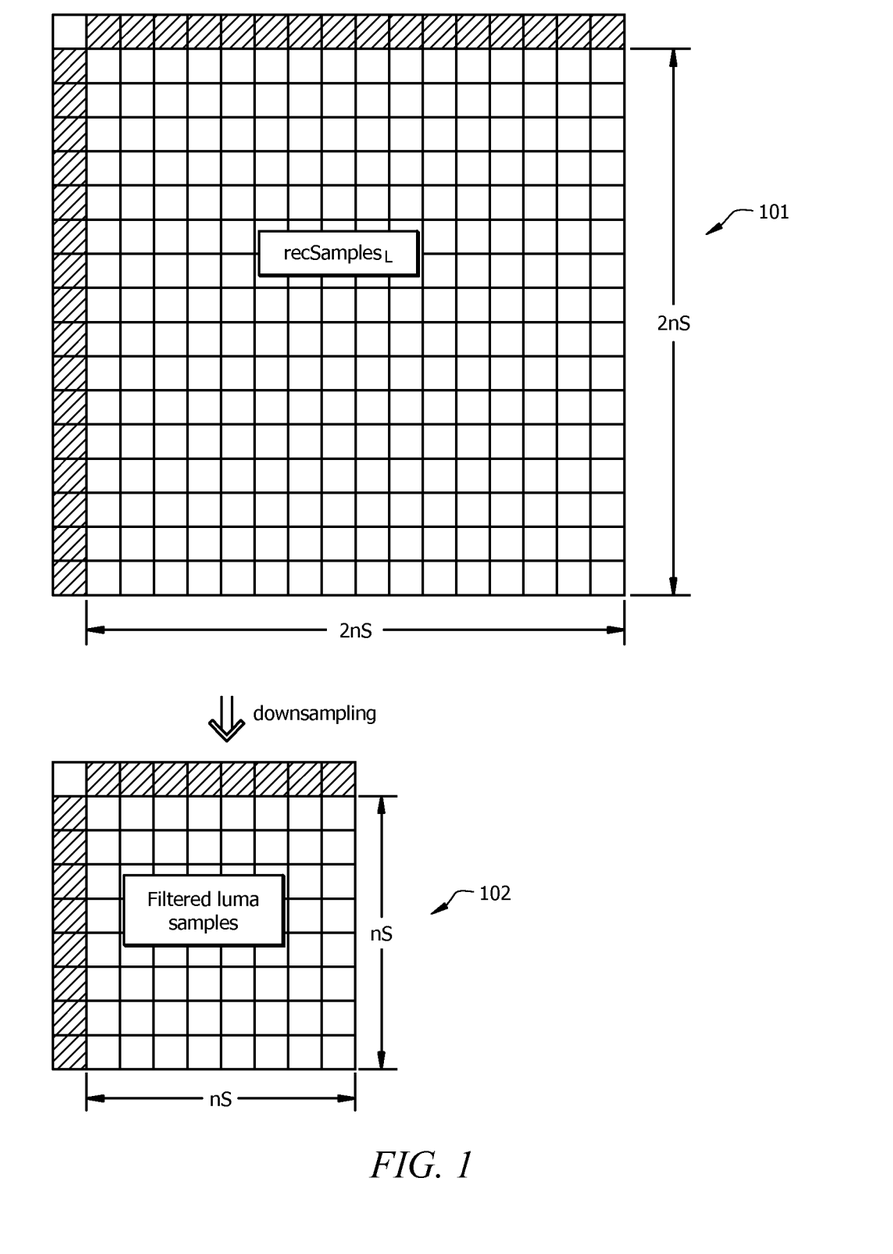
FIG. 1 is an illustration of downsampling of filtered luma samples.

FIG. 1 is an illustration of downsampling of filtered luma samples that takes place according to equations (2) and (3). As shown in FIG. 1, 2nS×2nS luma samples 101 are downsampled to nS×nS filtered luma samples 102, and 2nS filtered luma samples, comprising nS "left" neighboring samples $p_y'$ [x, −1] for x=0,1, ... nS−1 and nS "above" or "top" neighboring samples p[−1, y] for y=0, 1, ... nS−1, are used in equations (4) through (7). Although not shown in FIG. 1, 2nS chroma samples, comprising nS "left" neighboring samples p[x, −1] for x=0, ..., nS−1 and nS "above" or "top" neighboring samples p[−1, y] for y=0, ... nS−1, are used in equations (4) through (7). (Recall that standard array notation may be used in which [x,y] denotes row position x and column position y.) For each block, the total number of additions in equations (4) through (7) may be 8*nS, and the total number of multiplications may be 4*nS.

Disclosed herein are systems, methods, and apparatuses for reducing the complexity of intra prediction in the LM mode. Schemes are presented for downsampling chroma samples and luma samples in order to reduce complexity of intra prediction in LM mode. The schemes may be implemented in a video codec. In one embodiment, downsampling may be accomplished by selecting one of every two or four samples for use in intra prediction calculations. In another embodiment, downsampling may be accomplished by performing a sliding average of groups of samples to yield a reduced number of samples. By reducing the number of samples, a number of additions and multiplications may be reduced with little loss in coding performance.

Figure 2:
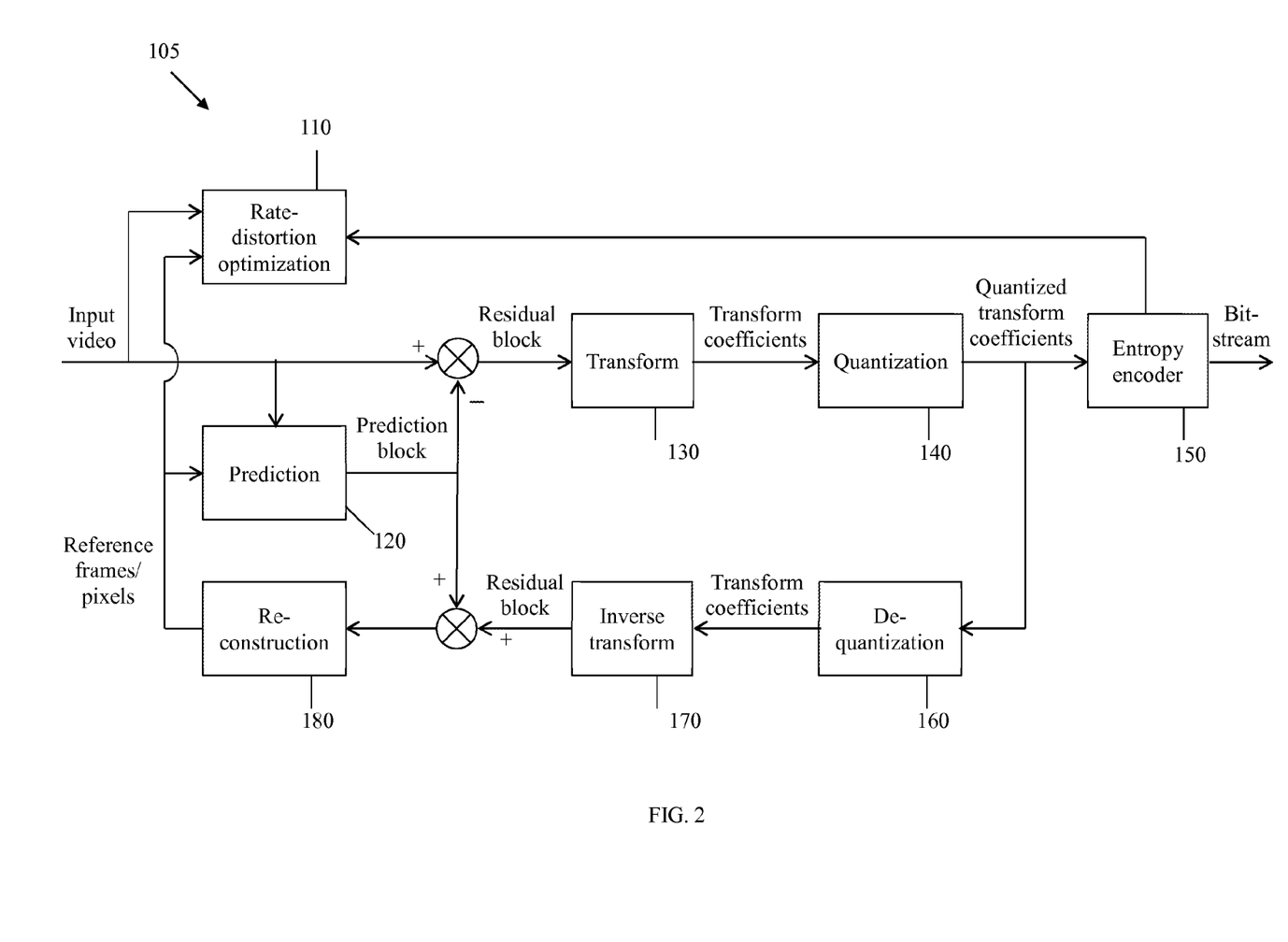
FIG. 2 is a schematic diagram of an embodiment of a video encoder.

FIG. 2 illustrates an embodiment of a video encoder 105, in which a disclosed LM mode may be used. The video encoder 105 may comprise a rate-distortion optimization (RDO) module 110, a prediction module 120, a transform module 130, a quantization module 140, an entropy encoder 150, a de-quantization module 160, an inverse transform module 170, and a reconstruction module 180 arranged as shown in FIG. 2. In operation, the video encoder 105 may receive an input video comprising a sequence of video frames (or slices). Herein, a frame may refer to any of a predicted frame (P-frame), an intra-coded frame (I-frame), or a bi-predictive frame (B-frame). Likewise, a slice may refer to any of a P-slice, an I-slice, or a B-slice.

The RDO module 110 may be configured to coordinate or make logic decisions for one or more of other modules. For example, based on one or more previously encoded frames, the RDO module 110 may determine how a current frame (or slice) being encoded is partitioned into a plurality of coding units (CUs), and how a CU is partitioned into one or more prediction units (PUs) and transform units (TU5). CU, PU, and TU are various types of blocks used in HEVC. In addition, the RDO module 110 may determine how the current frame is to be predicted. The current frame may be predicted via inter and/or intra prediction. For intra prediction, there are a plurality of available prediction modes or directions in HEVC (e.g., 34 modes for the Y component and six modes (including LM mode) for the U or V component), and an optimal mode may be determined by the RDO module 110. For example, the RDO module 110 may calculate a sum of absolute error (SAE) for each prediction mode, and select a prediction mode that results in the smallest SAE.

The prediction module 120 may utilize either reference frames for inter prediction or reference pixels in the current frame for intra prediction. In an embodiment, the prediction module 120 is configured to use a disclosed LM mode to generate a prediction block for a current chroma block from the input video. The prediction block comprises a plurality of predicted chroma samples, each of which may be generated based on a first plurality of reconstructed luma samples located in a corresponding reconstructed luma block, a second plurality of reconstructed luma samples located in neighboring blocks of the corresponding reconstructed luma block, and a plurality of reconstructed chroma samples located in neighboring blocks of the chroma block. In an embodiment, generating the plurality of predicted chroma samples includes computing the intermediate variable a2s using e.g., equation (13) described earlier, which is based on the second plurality of reconstructed luma samples. Generating the plurality of predicted chroma samples further includes deriving the intermediate variable 1 mDiv from a2s using a look-up table. In an embodiment, the look-up table may comprise less than 63 a2s values.

Upon generation of the prediction block for the current chroma block, the current chroma block may be subtracted by the prediction block, or vice versa, to generate a residual block. The residual block may be fed into the transform module 130, which may convert residual chroma samples into a matrix of transform coefficients via a two-dimensional orthogonal transform, such as a discrete cosine transform (DCT). Then, the matrix of transform coefficients may be quantized by the quantization module 140 before being fed into the entropy encoder 150. The quantization module 140 may alter the scale of the transform coefficients and round them to integers, which may reduce the number of non-zero transform coefficients. As a result, a compression ratio may be increased. Quantized transform coefficients may be scanned and encoded by the entropy encoder 150 into an encoded bitstream. Further, to facilitate continuous encoding of chroma blocks, the quantized transform coefficients may also be fed into the de-quantization module 160 to recover the original scale of the transform coefficients. Then, the inverse transform module 170 may perform the inverse of the transform module 130 and generate a noisy version of the original residual block. Then, the lossy residual block may be fed into the reconstruction module 180, which may generate reconstructed luma and/or chroma samples for intra prediction of future chroma blocks. If desired, filtering may be performed on the reconstructed samples before they are used for intra prediction.

It should be noted that FIG. 2 may be a simplified illustration of a video encoder, thus it may include only part of modules present in the video encoder. Other modules (e.g., filter, scanner, and transmitter), although not shown in FIG. 2, may also be included to facilitate video encoding as understood by one of skill in the art. In addition, depending on the encoding scheme, some of the modules in the video encoder may be skipped. For example, in lossless encoding of certain video content, no information loss may be allowed, thus the quantization module 140 and the de-quantization module 160 may be skipped. For another example, if the residual block is encoded directly without being converted to transform coefficients, the transform module 130 and the inverse transform module 170 may be skipped. Moreover, prior to transmission from the encoder, the encoded bitstream may be configured to include other information, such as video resolution, frame rate, block partitioning information (sizes, coordinates), prediction modes, etc., so that the encoded sequence of video frames may be properly decoded by a video decoder.

Figure 3:
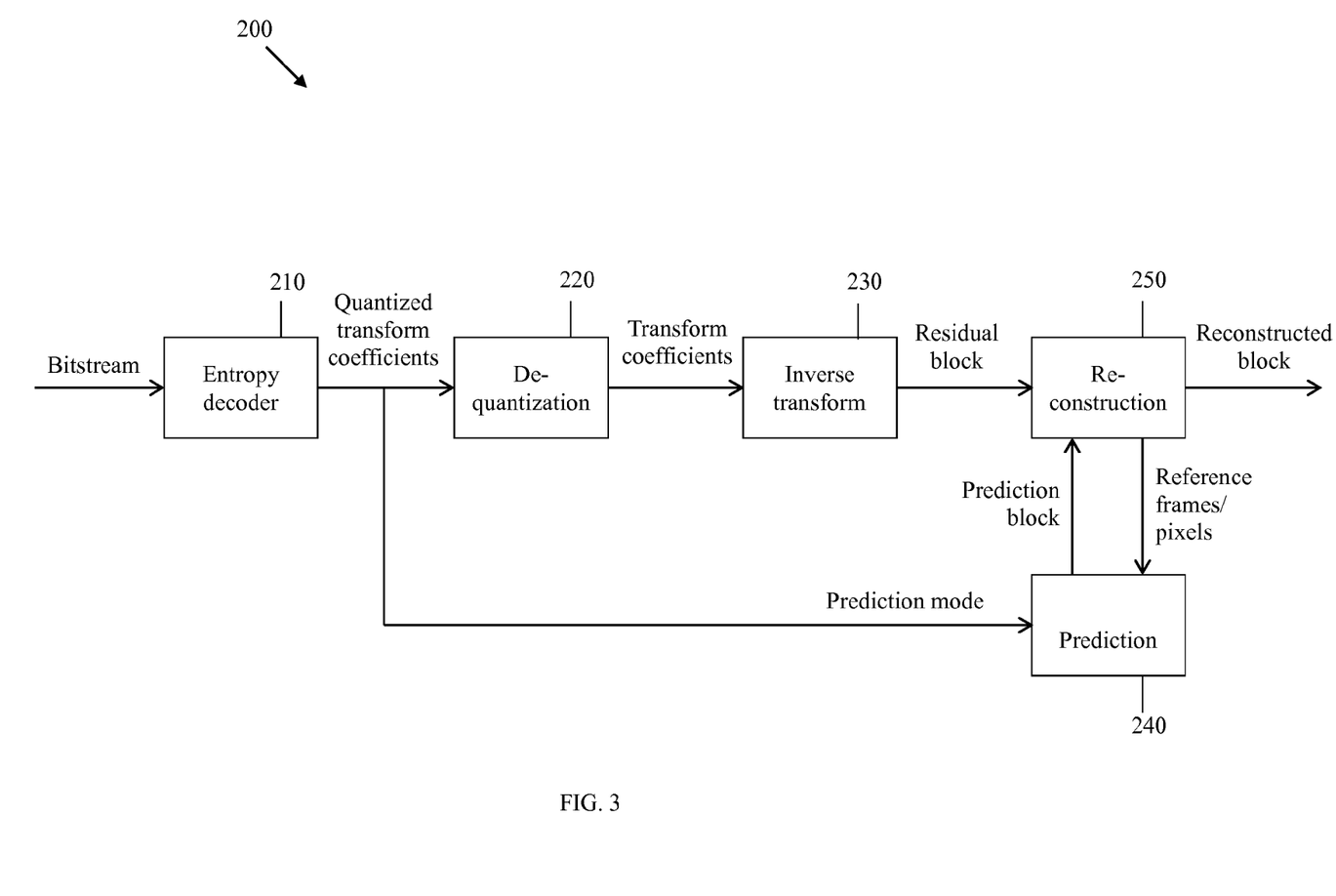
FIG. 3 is a schematic diagram of an embodiment of a video decoder.

FIG. 3 illustrates an embodiment of a video decoder 200, in which a disclosed LM mode may be used. The video decoder 200 may correspond to the video encoder 105, and may comprise an entropy decoder 210, a de-quantization module 220, an inverse transform module 230, a prediction module 240, and a reconstruction module 250 arranged as shown in FIG. 3. In operation, an encoded bitstream containing information of a sequence of video frames may be received by the entropy decoder 210, which may decode the bitstream to an uncompressed format. A matrix of quantized transform coefficients may be generated, which may then be fed into the de-quantization module 220, which may be the same or similar to the de-quantization module 160 in FIG. 3. Then, output of the de-quantization module 220 may be fed into the inverse transform module 230, which may convert transform coefficients to residual values of a residual block. In addition, information containing a prediction mode (e.g., the LM mode) of the current block may also be decoded by the entropy decoder 210. Based on the prediction mode, the prediction module 240 may generate a prediction block for the current block.

In an embodiment, the prediction module 240 is configured to use a disclosed LM mode to generate a prediction block for a current chroma block. The prediction block comprises a plurality of predicted chroma samples, each of which may be generated based on a first plurality of reconstructed luma samples located in a corresponding reconstructed luma block (already decoded), a second plurality of reconstructed luma samples located in neighboring blocks (already decoded) of the corresponding reconstructed luma block, and a plurality of reconstructed chroma samples located in neighboring blocks (already decoded) of the chroma block.

Upon generation of the prediction block for the current chroma block, the reconstruction module 250 may combine the residual chroma block with the prediction block to generate a reconstructed chroma block. Additionally, to facilitate continuous decoding, some chroma samples of the reconstructed chroma block may also serve as reference pixels for intra prediction of future chroma blocks in the same frame.

In a video codec (e.g., the video encoder 105 or decoder 200), to simplify the LM mode used in intra prediction, the chroma samples p[x, y] and filtered luma samples $p_Y'[x, y]$ may be downsampled prior to further processing. In one embodiment, the chroma samples and filtered luma samples are downsampled by using every second sample (if downsampling by a factor of two) or every fourth sample (if downsampling by a factor of four). Downsampling may occur if the chroma block size is 16×16 or 8×8. In current proposed HEVC implementations, the maximum chroma block size may be 16×16. However, one of skill in the art will recognize that if block sizes larger than 16×16 are employed, this downsampling scheme may be used.

For downsampling by a factor of N, equations (4) through (7) may be rewritten as:

$$L = \left( \sum_{y=0}^{nS/N-1} p_Y'[-1, N*y] + \sum_{x=0}^{nS/N-1} p_Y'[N*x, -1] \right) \gg k3 \quad (19)$$

$$C = \left( \sum_{y=0}^{nS/N-1} p[-1, N*y] + \sum_{x=0}^{nS/N-1} p[N*x, -1] \right) \gg k3 \quad (20)$$

$$LL = \left( \sum_{y=0}^{nS/N-1} p_Y'[-1, N*y]^2 + \sum_{x=0}^{nS/N-1} p_Y'[N*x, -1]^2 \right) \gg k3 \quad (21)$$

$$LC = \left( \sum_{y=0}^{nS/N-1} p_Y'[-1, N*y] * p[-1, N*y] + \sum_{x=0}^{nS/N-1} p_Y'[N*x, -1] * p[N*x, -1] \right) \gg k3, \quad (22)$$

where k3 is redefined as k3=Max(0, BitDepth$_C$+log$_2$(nS/N)−14). Note that these equations reduce by a factor of N the number of top and left neighboring luma and chroma samples are used in the calculations. For example, if nS=8 and N=2, only samples p[−1,0] p[−1,2] p[−1,4] p[−1,6] may be used in the calculations and samples p[−1,1] p[−1,3] p[−1,5] p[−1,7] may be skipped or not used. Similarly, only a portion of the samples for p[x, −1], $p_{Y[-1}$, y], and $p_Y$[x, −1] may be used. Thus, equations (19) through (22) may replace equations (4) through (7) and the number of chroma samples and reconstructed luma samples that are used may be reduced by a factor of N.

There are at least two variations of this scheme. In a first variation, for video coding and decoding, the number of top and left reference samples used are downsampled to 4×4 if nS>4. That is, prediction block sizes of 16×16 may be downsampled by a factor of N=4, prediction block sizes of 8×8 may be downsampled by a factor of N=2, and prediction block sizes of 4×4 may not be downsampled. The first variation may be referred to as a "downsampling to 4" case. In a second variation, the number if top and left reference samples used are downsampled to 8×8 if nS>8. In other words, prediction block sizes of 16×16 are downsampled by a factor of N=2, but prediction block sizes of 8×8 and 4×4 are not downsampled. The second variation may be referred to as a "downsampling to 8" case.

Figure 4:
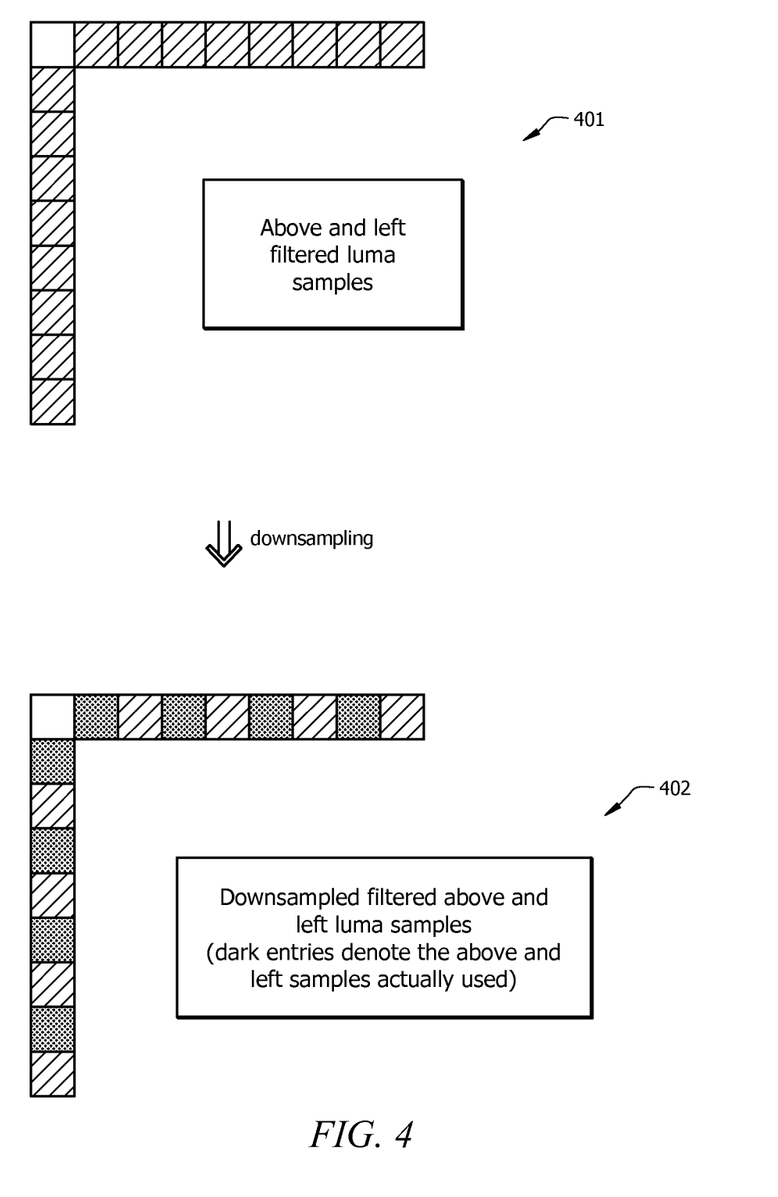
FIG. 4 is an illustration of downsampling of top and left neighboring filtered luma samples according to one embodiment.

FIG. 4 is an illustration of downsampling of top (sometimes referred to as "above") and left neighboring vectors of filtered luma samples according to one embodiment. The samples in 401 represent top and left neighboring vectors of filtered luma samples. The relationship of these samples 401 to a filtered luma block, which corresponds to a received chroma block, is illustrated in 102 of FIG. 1. After a downsampling process as illustrated in FIG. 4, the darkened samples in the group of samples 402 represent the downsampled top and left neighboring vectors that may be used in computing a predicted chroma block using equations (19), (21), and (22). In a similar manner, top and left neighboring vectors of chroma samples (neighboring a chroma block) may be downsampled and used in equation (20) for computing a predicted chroma block.

Thus, the reduction of related additions and multiplications may be as follows: (1) for the down sampling to 4 case there may be a 75% reduction for blocks with size 16×16, a 50% reduction for blocks with size 8×8, and no reduction for blocks with size 4×4; and (2) for the down sampling to 8 case, there may be a 50% reduction for blocks with size 16×16, and no reduction for blocks with sizes 8×8 or 4×4.

Embodiments of the downsampling schemes discussed above can be tested and compared with HEVC test model (HM) anchors. To evaluate coding performance for the downsampling schemes, simulations were performed for both the downsampling to 4 and downsampling to 8 cases under an Intra High Efficiency (HE) configuration. Testing results include the average percentage Bjontegaard Delta (BD) rates for the three components of color space (Y, Cb, and Cr). In the simulations, the BD rates of intra prediction using the disclosed LM mode were compared with the LM mode used in a HM 5.0 anchor. The BD rate change for each case is as follows: (1) for the downsampling to 4 case there may be a 0.06% loss on luma (Y), 0.65% loss on blue-difference chroma (Cb), 0.52% loss on red-difference chroma (Cr); and (2) for the downsampling to 8 case there may be a 0.02% loss on luma (Y), 0.19% loss on blue-difference chroma (Cb), 0.13% loss on red-difference chroma (Cr). Thus, the impact on coding performance of downsampling may be negligible.

In another embodiment of downsampling, an averaging process may be employed to downsample luma and chroma samples. For downsampling factor N, new quantities may be defined as follows:

$$\text{avgLL}[y] = \frac{1}{N} \sum_{i=0}^{N-1} p'_Y[-1, N*y+i] \quad (23)$$

$$\text{avgLC}[y] = \frac{1}{N} \sum_{i=0}^{N-1} p[-1, N*y+i] \quad (24)$$

$$\text{avgAL}[x] = \frac{1}{N} \sum_{i=0}^{N-1} p'_Y[N*x+i, -1] \quad (25)$$

and $$\text{avgAC}[x] = \frac{1}{N} \sum_{i=0}^{N-1} p[N*x+i, -1] \quad (26)$$

for x,y=0, ... nS/N−1.

The averaging process may be viewed as a sliding averaging process or a sliding window averaging process wherein a window of N samples is averaged and then the window is moved to a next group of N samples. For example, for nS=8 and N=2, the following four pairs of chroma samples may be averaged to yield four values of avgLC: p[−1,0] and p[−1,1], p[−1,2] and p[−1,3], p[−1,4] and p[−1,5], and p[−1,6] and p[−1,7]. Similarly, four pairs of samples may be averaged to yield four values of avgLL, avgAL, and avgAC.

Given these new quantities, equations (4) through (7) may be replaced by the following:

$$L = \left( \sum_{y=0}^{nS/N-1} \text{avgLL}[y] + \sum_{x=0}^{nS/N-1} \text{avgAL}[x] \right) \gg k3 \quad (27)$$

$$C = \left( \sum_{y=0}^{nS/N-1} \text{avgLC}[y] + \sum_{x=0}^{nS/N-1} \text{avgAC}[x] \right) \gg k3 \quad (28)$$

$$LL = \left( \sum_{y=0}^{nS/N-1} \text{avgLL}[y]^2 + \sum_{x=0}^{nS/N-1} \text{avgAL}[x]^2 \right) \gg k3 \quad (29)$$

$$LC = \left( \sum_{y=0}^{nS/N-1} \text{avgLL}[y]*\text{avgLC}[y] + \sum_{x=0}^{nS/N-1} \text{avgAL}[x]*\text{avgAC}[x] \right) \gg k3, \quad (30)$$

where k3 is redefined as k3=Max(0, BitDepth$_C$+log$_2$(nS/N)−14).

As with the first scheme, there are at least two variations of this second scheme. As described earlier for the "downsampling to 4" case, in a first variation, for video coding and decoding, the number of top and left reference samples used may be downsampled to 4×4 if nS>4. That is, prediction block sizes of 16×16 may be downsampled by a factor of N=4, prediction block sizes of 8×8 may be downsampled by a factor of N=2, and prediction block sizes of 4×4 may not be downsampled. In a second variation, referred to as the "downsampling to 8" case, the top and left reference samples may be downsampled to 8×8 if nS>8. That is, prediction block sizes of 16×16 may be downsampled by a factor of N=2, and prediction block sizes of 8×8 and 4×4 may not be downsampled.

Table 2 shows testing results of the average downsampling scheme for the downsampling to 8 case in comparison to the HM 5.0 anchor. Testing results included the average percentage BD rates on a plurality of resolution classes (Classes A, B, C, D, E, and F) for the three components of color space (Y, U, and V), as well as encoding (Enc) and decoding (Dec) times. In class A, only video sequences with an input bit depth of 8 are tested. Results suggest that the average BD rates of the downsampling scheme show little to no change. For example, the average BD rate of A, B, C, D, and E classes showed no change for the Y and U components and increased by only 0.02% for the V component. Further, the encoding (Enc) time of the test case remained the same, and the decoding (Dec) time increased by only 2%.

Table 3 shows testing results of the average downsampling scheme for the downsampling to 4 case. As for Table 2, results suggest that the average BD rates of the downsampling scheme show little to no change.

TABLE 2

Results for the downsampling to 8 case.

| | All Intra HE | | |
|---|---|---|---|
| | Y | U | V |
| Class A (8 bit) | 0.00% | 0.00% | 0.05% |
| Class B | −0.01% | 0.00% | 0.05% |
| Class C | 0.00% | 0.00% | 0.02% |
| Class D | 0.00% | 0.04% | −0.01% |
| Class E | 0.00% | −0.04% | −0.01% |
| Overall | 0.00% | 0.00% | 0.02% |
| Overall with Class F | 0.00% | 0.01% | 0.02% |
| Class F | 0.00% | −0.11% | −0.05% |
| Enc Time[%] | | 100% | |
| Dec Time[%] | | 102% | |

TABLE 3

Results for the downsampling to 4 case.

| | All Intra HE | | |
|---|---|---|---|
| | Y | U | V |
| Class A (8 bit) | 0.02% | 0.05% | 0.15% |
| Class B | 0.00% | 0.06% | 0.13% |
| Class C | 0.00% | −0.01% | 0.03% |
| Class D | 0.00% | 0.08% | 0.02% |
| Class E | 0.00% | 0.00% | −0.06% |
| Overall | 0.00% | 0.04% | 0.05% |
| Overall with Class F | 0.00% | 0.04% | 0.06% |
| Class F | −0.01% | 0.00% | 0.07% |
| Enc Time[%] | | 100% | |
| Dec Time[%] | | 103% | |

Figure 5:
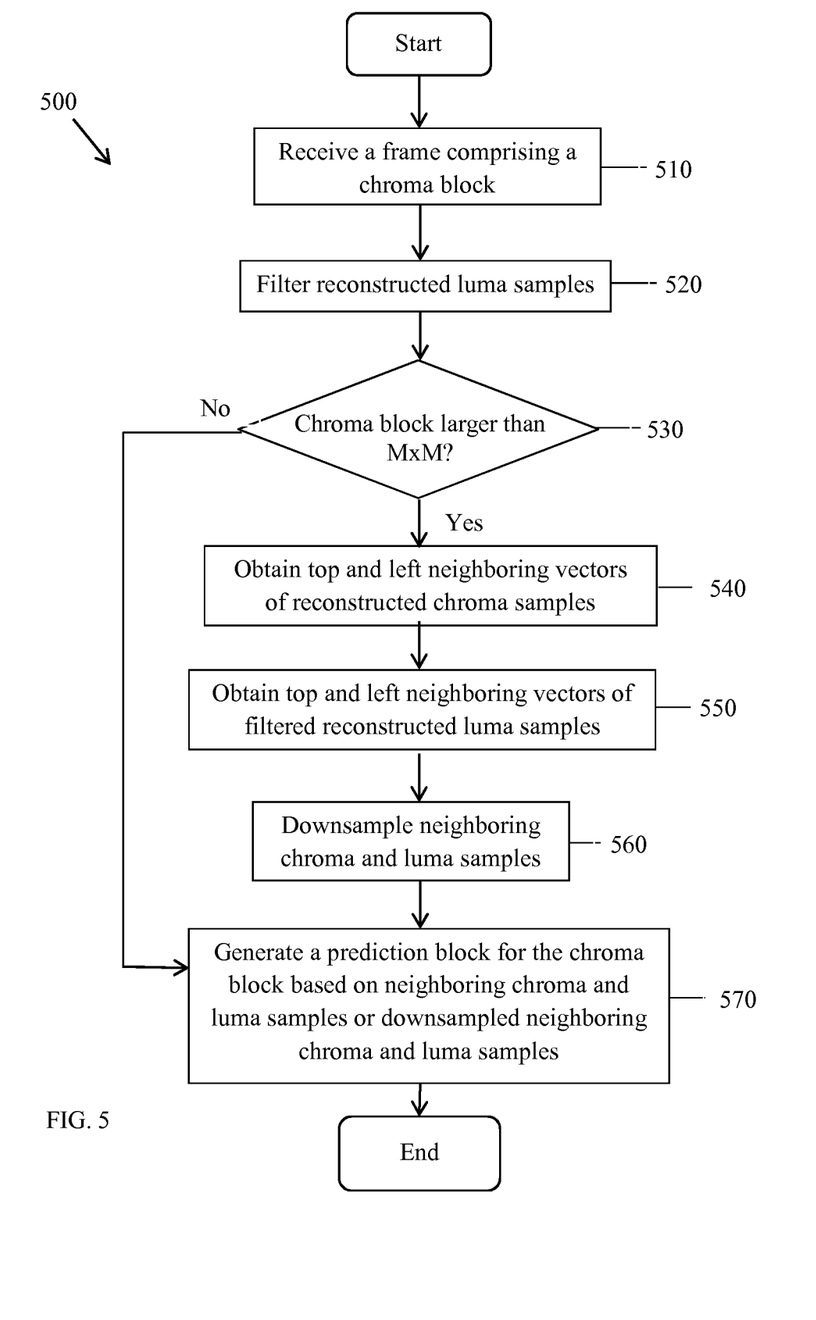
FIG. 5 is a flowchart of an embodiment of an intra prediction method.

FIG. 5 is a flowchart of an embodiment of an intra prediction method 500 using a disclosed LM mode. The method 500 may be implemented in a video encoder (e.g., video encoder 105 in FIG. 2) and/or a video decoder (e.g., the video decoder 200 in FIG. 3). The method starts in step 510, wherein a video frame or slice comprising a current chroma block may be received. The video frame may also comprise already-coded blocks including a reconstructed luma block corresponding to the current chroma block, reconstructed luma samples neighboring the corresponding luma block (e.g., top and left neighboring vectors), and reconstructed chroma samples neighboring the current chroma block (e.g., top and left neighboring vectors). The corresponding luma block comprises a plurality of reconstructed luma samples.

Next, in step 520 the reconstructed luma samples may be filtered or downsampled to generate filtered luma samples, which will then be used as reference samples. After filtering, a width of the corresponding reconstructed luma block may be reduced to half, which equals a width of the current chroma block. The filtering of the reconstructed luma samples may, for example, proceed according to equations (2) and (3) and as further illustrated in FIG. 1.

Next, in step 530, a decision is made whether the chroma block has dimensions larger than M×M (i.e., a threshold block size). If so, the method proceeds to step 540, wherein top and left neighboring vectors of reconstructed chroma samples are obtained (e.g., vectors p [x, −1] and p[−1, y], respectively, described previously), and step 550, wherein top and left neighboring vectors of filtered reconstructed luma samples are obtained (e.g., vectors p'$_Y$[x, −1] and p'$_Y$[−1, y], respectively, described previously). If the chroma block has dimensions larger than 4×4, the method next proceeds to step 560. In step 560, the neighboring chroma and luma samples are downsampled. For example, the neighboring chroma and luma samples may be downsampled by selecting every Nth sample as described earlier using, e.g., equations (19) through (22), or by performing a sliding averaging process using, e.g., equations (23) through (26). As discussed previously, the block size threshold may be 4×4 (e.g., downsampling to 4) or 8×8 (e.g., downsampling to 8) for employing downsampling.

In step 570, a prediction block for the chroma block is generated based on neighboring chroma and luma samples (e.g., if the chroma block is 4×4) or downsampled neighboring chroma and luma samples (e.g., if the chroma block is larger than 4×4). The prediction block may be generated using equations (9) through (18) with the calculations for L, C, LL, and LC depending on whether and what type of downsampling is used. The steps of the method 500 may be repeated for a plurality of chroma blocks in the frame. Further, the steps of the method 500 may be repeated for each of a sequence of frames, and for each of a plurality of chroma blocks in each frame.

Figure 6:
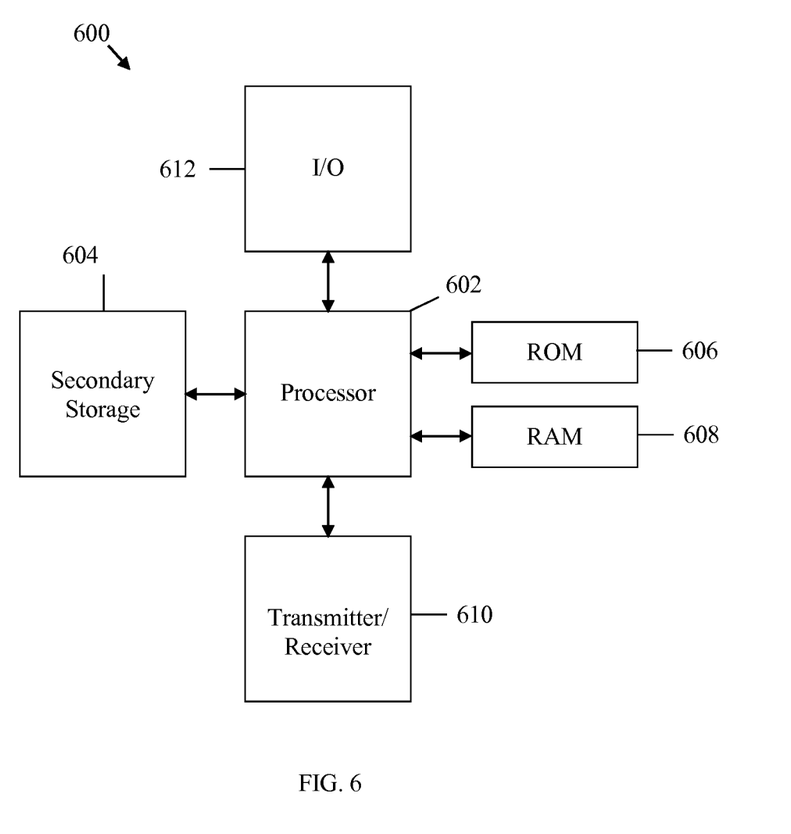
FIG. 6 is a schematic diagram of a general purpose computer system.

The schemes described above may be implemented on any general-purpose computer system, such as a computer or network component with sufficient processing power, memory resources, and network throughput capability to handle the necessary workload placed upon it. FIG. 6 illustrates a schematic diagram of a general-purpose computer system 600 suitable for implementing one or more embodiments of the schemes, methods, or schematic diagrams disclosed herein, such as the video encoder 105, the video decoder 200, and the intra prediction method 500. The computer system 600 includes a processor 602 (which may be referred to as a central processor unit or CPU) that is in communication with memory devices including secondary storage 604, read only memory (ROM) 606, random access memory (RAM) 608, transmitter/receiver 610, and input/output (I/O) device 612. Although illustrated as a single processor, the processor 602 is not so limited and may comprise multiple processors. The processor 602 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 602 may be configured to implement any of the schemes, including implementation of pseudo code, described herein, such as the video encoder 105, the video decoder 200, and the intra prediction method 500. The processor 602 may be implemented using hardware, software, or both.

The secondary storage 604 is typically comprised of one or more disk drives or tape drives and is used for non-volatile storage of data and as an over-flow data storage device if the RAM 608 is not large enough to hold all working data. The secondary storage 604 may be used to store programs that are loaded into the RAM 608 when such programs are selected for execution. The ROM 606 is used to store instructions and perhaps data that are read during program execution. The ROM 606 is a non-volatile memory device that typically has a small memory capacity relative to the larger memory capacity of the secondary storage 604. The RAM 608 is used to store volatile data and perhaps to store instructions. Access to both the ROM 606 and the RAM 608 is typically faster than to the secondary storage 604.

The transmitter/receiver (or transceiver) 610 may serve as an output and/or input device of the computer system 600. For example, if the transmitter/receiver 610 is acting as a transmitter, it may transmit data out of the computer system 600. If the transmitter/receiver 610 is acting as a receiver, it may receive data into the computer system 600. The transmitter/receiver 610 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These transmitter/receiver devices 610 may enable the processor 602 to communicate with an Internet or one or more intranets.

I/O devices 612 may include a video monitor, liquid crystal display (LCD), touch screen display, or other type of video display for displaying video, and may also include a video recording device for capturing video. I/O devices 612 may also include one or more keyboards, mice, or track balls, or other well-known input devices.

It is understood that by programming and/or loading executable instructions onto the computer system 600, at least one of the processor 602, the RAM 608, and the ROM 606 are changed, transforming the computer system 600 in part into a particular machine or apparatus, e.g., a video codec, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_1$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:
1. A video codec comprising:
a processor configured to:
generate a prediction block for a chroma block, wherein the prediction block comprises a predicted chroma sample, wherein the predicted chroma sample is based on:
a filtered reconstructed luma sample located in a corresponding reconstructed luma block;

a plurality of downsampled filtered reconstructed luma samples located in positions neighboring the corresponding reconstructed luma block, the downsampled filtered reconstructed luma samples comprise every Nth filtered reconstructed luma sample of a top neighboring vector of reconstructed luma samples and a left neighboring vector of reconstructed luma samples, where N is an integer greater than one; and a plurality of downsampled chroma samples located in positions neighboring the chroma block, the downsampled chroma samples comprise every Nth chroma sample of a top neighboring vector of chroma samples and a left neighboring vector of chroma samples;

generate a second reconstructed luma block corresponding to a second chroma block; and generate a second prediction block for the second chroma block based on the corresponding second reconstructed luma block, wherein the second prediction block is further based on a subset of a plurality of filtered reconstructed luma samples located in positions neighboring the second reconstructed luma block when the second chroma block is of dimension 16×16 or 8×8, wherein the subset is obtained by downsampling, and otherwise wherein the second prediction block is further based on the plurality of filtered reconstructed luma samples located in positions neighboring the second reconstructed luma block.

2. A video codec comprising:

a processor configured to:

generate a prediction block for a chroma block, wherein the prediction block comprises a predicted chroma sample, wherein the predicted chroma sample is based on:
  a filtered reconstructed luma sample located in a corresponding reconstructed luma block;
  a plurality of downsampled filtered reconstructed luma samples located in positions neighboring the corresponding reconstructed luma block, wherein the downsampled filtered reconstructed luma samples comprise a sliding average of a top neighboring vector of reconstructed luma samples and a left neighboring vector of reconstructed luma samples; and
  a plurality of downsampled chroma samples located in positions neighboring the chroma block, the downsampled chroma samples comprise a sliding average of a top neighboring vector of chroma samples and a left neighboring vector of chroma samples;

wherein the sliding average of the top neighboring vector of reconstructed luma samples comprises $$\frac{1}{N}\sum_{i=0}^{N-1} p'_Y[N*x+i, -1]$$

for x=0, ..., nS/N−1, where nS is a dimension of the chroma block, N is a downsampling factor, and $p_Y'[x, -1]$ for x=0, ..., nS−1 is the left neighboring vector, and wherein the sliding average of the left neighboring vector of reconstructed luma samples comprise $$\frac{1}{N}\sum_{i=0}^{N-1} p'_Y[-1, N*y+i]$$

for y=0, ..., nS/N−1, where $p_Y'[-1, y]$ for y=0, ..., nS−1 is the top neighboring vector.

3. A method used in video coding to generate predicted chroma samples for a chroma block, comprising:

downsampling, performed by a video coder at least partially implemented in hardware, filtered reconstructed luma samples located in positions neighboring a reconstructed luma block to generate a plurality of downsampled filtered reconstructed luma samples, the downsampled filtered reconstructed luma samples comprise every Nth filtered reconstructed luma sample of a top neighboring vector of reconstructed luma samples and a left neighboring vector of reconstructed luma samples, where N is an integer greater than one;

downsampling, performed by the video coder, reconstructed chroma samples located in positions neighboring a chroma block to generate a plurality of downsampled reconstructed chroma samples, the downsampled chroma samples comprise every Nth chroma sample of a top neighboring vector of chroma samples and a left neighboring vector of chroma samples; and generating, performed by the video coder, a prediction block for the chroma block, wherein the prediction block comprises a predicted chroma sample, wherein the predicted chroma sample is based on:
  a filtered reconstructed luma sample located in the reconstructed luma block;
  the plurality of downsampled filtered reconstructed luma samples; and
  the plurality of downsampled reconstructed chroma samples; and generating a second reconstructed luma block corresponding to a second chroma block; generating a second prediction block for the second chroma block based on the corresponding second reconstructed luma block, wherein the second prediction block is further based on a subset of a plurality of filtered reconstructed luma samples located in positions neighboring the second reconstructed luma block when the second chroma block is of dimension 16×16 or 8×8, wherein the subset is obtained by downsampling, and otherwise wherein the second prediction block is further based on the plurality of filtered reconstructed luma samples located in positions neighboring the second reconstructed luma block.

4. The method of claim 3, wherein the downsampled filtered reconstructed luma samples comprise an average of a top neighboring vector of reconstructed luma samples and a left neighboring vector of reconstructed luma samples.

5. The method of claim 4, wherein the downsampled chroma samples comprise a sliding average of a top neighboring vector of chroma samples and a left neighboring vector of chroma samples.

6. The method of claim 5, wherein the sliding average of the top neighboring vector of reconstructed luma samples comprise $$\frac{1}{N}\sum_{i=0}^{N-1} p'_Y[N*x+i, -1]$$

for x=0, ..., nS/N−1, where nS is a dimension of the chroma block, N is a downsampling factor, and $p_Y'[x, -1]$ for x=0, ..., nS−1 is the left neighboring vector, and wherein the sliding average of the left neighboring vector of reconstructed luma samples comprises $$\frac{1}{N}\sum_{i=0}^{N-1} p'_Y[-1, N*y+i]$$

for y=0, ..., nSN−1, where $p_Y'[-1, y]$ for y=0, ..., nS−1 is the top neighboring vector.

7. A video codec comprising:
a processor configured to:
generate a filtered reconstructed luma block corresponding to a chroma block;
downsample a plurality of filtered reconstructed luma samples and a plurality of reconstructed chroma samples to generate downsampled filtered reconstructed luma samples and downsampled reconstructed chroma samples, respectively, when the chroma block is larger than a threshold block size, the plurality of filtered reconstructed luma samples are located in neighboring blocks of the filtered reconstructed luma block, and the plurality of reconstructed chroma samples are located in neighboring blocks of the chroma block;
generate a prediction block for the chroma block, the prediction block comprises a plurality of predicted chroma samples, each of the plurality of predicted chroma samples is based on:
a corresponding reconstructed luma sample located in a corresponding reconstructed luma block;
the downsampled filtered reconstructed luma samples and the downsampled reconstructed chroma samples when the chroma block is larger than the threshold block size; and
the plurality of filtered reconstructed luma samples and the plurality of reconstructed chroma samples when the chroma block is equal to the threshold block size,
wherein the threshold block size is 4×4, and the downsampling of is by a factor of two when the chroma block is 8×8 and the downsampling is by a factor of four when the chroma block is 16×16.

8. The video codec of claim 7, wherein the downsampling of the filtered reconstructed luma samples comprises performing a sliding average of a top neighboring vector of reconstructed luma samples and a left neighboring vector of reconstructed luma samples.

9. The video codec of claim 8, wherein the downsampling of the reconstructed chroma samples comprises performing a sliding average of a top neighboring vector of chroma samples and a left neighboring vector of chroma samples.

10. The video codec of claim 7, wherein the downsampling of the filtered reconstructed luma samples comprises selecting every Nth filtered reconstructed luma sample of a top neighboring vector of reconstructed luma samples and a left neighboring vector of reconstructed luma samples, where N is an integer greater than one.

11. The video codec of claim 10, wherein the downsampling of chroma samples comprises selecting every Nth chroma sample of a top neighboring vector of chroma samples and a left neighboring vector of chroma samples.

* * * * *